(12) United States Patent
Jinbo et al.

(10) Patent No.: US 9,719,385 B2
(45) Date of Patent: Aug. 1, 2017

(54) HONEYCOMB FILTER

(75) Inventors: Naoyuki Jinbo, Ibi-gun (JP); Takeshi Ushida, Ibi-gun (JP); Akinori Orito, Ibi-gun (JP); Yuichi Nagatsu, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 355 days.

(21) Appl. No.: 14/389,370

(22) PCT Filed: Mar. 30, 2012

(86) PCT No.: PCT/JP2012/058741
§ 371 (c)(1),
(2), (4) Date: Sep. 29, 2014

(87) PCT Pub. No.: WO2013/145314
PCT Pub. Date: Oct. 3, 2013

(65) Prior Publication Data
US 2015/0121826 A1    May 7, 2015

(51) Int. Cl.
 *B01D 50/00*    (2006.01)
 *B01D 39/14*    (2006.01)
 (Continued)

(52) U.S. Cl.
 CPC ....... *F01N 3/0222* (2013.01); *B01D 46/2474* (2013.01); *C04B 41/009* (2013.01);
 (Continued)

(58) Field of Classification Search
 CPC ............. F01N 2330/06; F01N 2330/60; F01N 2510/00; F01N 3/0222; B01D 46/2474;
 (Continued)

(56) References Cited

U.S. PATENT DOCUMENTS

| 3,704,786 A | 12/1972 | Lerner et al. |
| 9,273,574 B2 * | 3/2016 | Tanaka ................ F01N 3/0222 |
| 2006/0119016 A1 * | 6/2006 | Shinohara ............. C04B 35/591 |
| | | 264/630 |

FOREIGN PATENT DOCUMENTS

| EP | 0870534 | 10/1998 |
| JE | WO2011040561 | * 4/2011 |
| JP | 2002-519186 | 7/2002 |
| JP | 2004-239199 | 8/2004 |
| JP | 2008-215093 | 9/2008 |
| JP | 2011-206679 | 10/2011 |
| JP | 2011-212671 | 10/2011 |
| JP | 2011-224514 | 11/2011 |
| JP | 2012-196656 | 10/2012 |
| WO | WO 2004/079167 | 9/2004 |

(Continued)

OTHER PUBLICATIONS

Extended European Search Report for corresponding EP Application No. 12872967.0-1354, Oct. 15, 2015.
(Continued)

*Primary Examiner* — Amber R Orlando
(74) *Attorney, Agent, or Firm* — Mori & Ward, LLP (57) ABSTRACT

An object of the present invention is to provide a honeycomb filter having low pressure loss and high collection efficiency. The honeycomb filter of the present invention comprises a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed by a sealing material, wherein the filter layer comprises spherical ceramic particles, and the average particle size of the spherical ceramic particles increases gradually from the fluid inlet side toward the fluid outlet side.

8 Claims, 8 Drawing Sheets

(51) Int. Cl.
| | |
|---|---|
| *B01D 39/06* | (2006.01) |
| *B01D 39/20* | (2006.01) |
| *F01N 3/022* | (2006.01) |
| *C04B 41/85* | (2006.01) |
| *C04B 41/00* | (2006.01) |
| *C04B 41/50* | (2006.01) |
| *B01D 46/24* | (2006.01) |
| *C04B 111/00* | (2006.01) |

(52) U.S. Cl.
CPC .......... *C04B 41/5089* (2013.01); *C04B 41/85* (2013.01); *C04B 2111/00793* (2013.01); *F01N 2330/06* (2013.01); *F01N 2330/60* (2013.01); *F01N 2510/00* (2013.01); *Y02T 10/20* (2013.01)

(58) Field of Classification Search
CPC ... C04B 41/009; C04B 41/5089; C04B 41/85; C04B 2111/00793; Y02T 10/20
See application file for complete search history.

(56) References Cited

FOREIGN PATENT DOCUMENTS

| | | |
|---|---|---|
| WO | WO 2008/066167 | 6/2008 |
| WO | WO 2010/110011 | 9/2010 |
| WO | WO 2011/125766 | 10/2011 |
| WO | WO 2011/125767 | 10/2011 |
| WO | WO 2011/125772 | 10/2011 |

OTHER PUBLICATIONS

Japanese Office Action for corresponding JP Application No. 2015-507289, Jul. 28, 2015.
International Search Report for corresponding International Application No. PCT/JP2012/058741, May 1, 2012.
Written Opinion for corresponding International Application No. PCT/JP2012/058741, May 1, 2012.

\* cited by examiner

FIG. 1

Fluid inlet side → Fluid outlet side

Cross-sectional view along line A-A

HONEYCOMB FILTER

TECHNICAL FIELD

The present invention relates to a honeycomb filter.

BACKGROUND ART

The exhaust gas discharged from internal combustion engines such as diesel engines contains particulate matter (hereinafter also referred to as PM) such as soot and the like, and in recent years, the harm caused to people and the environment by this PM has become an issue. Furthermore, because the exhaust gas also contains harmful gas components such as CO, HC and $NO_x$, the effect of these harmful gas components on people and the environment is also a cause for concern.

Accordingly, in order to trap the PM in the exhaust gas and purge the harmful gas components, an exhaust gas cleaning device is used.

This type of exhaust gas cleaning device is prepared using a honeycomb filter composed of a material such as a ceramic. The exhaust gas can be cleaned by passing the exhaust gas through the honeycomb filter.

In a honeycomb filter used in an exhaust gas cleaning device to trap the PM in an exhaust gas, a multitude of cells separated by cell walls are disposed in parallel in the longitudinal direction, and each cell is sealed at one end. Consequently, the exhaust gas that flows into a given cell necessarily passes through a cell wall that separates the cells, and then flows out of another cell. In other words, if this type of honeycomb filter is provided in an exhaust gas cleaning device, then the PM contained in the exhaust gas is captured by the cell walls as it passes through the honeycomb filter. Accordingly, the cell walls of the honeycomb filter function as a filter that cleans the exhaust gas.

In the initial stage of PM trapping by the honeycomb filter, the PM infiltrates the fine pores in the cell walls and is trapped inside the cell walls, generating a "depth filtration" state in which the fine pores in the cell walls are blocked. In this depth filtration state, PM continues to accumulate inside (the fine pores in) the cell walls. As a result, a problem can occur in that immediately after the trapping of PM begins, the effective porosity of the cell walls is reduced, causing the pressure loss to suddenly increase.

Patent Document 1 discloses a honeycomb filter in which a composite region is formed by depositing particles on the surface layer portions of the cell walls that constitute the honeycomb filter.

PRIOR ART DOCUMENTS

Patent Documents

Patent Document 1: WO 2010/110011 pamphlet

DISCLOSURE OF INVENTION

Problems Invention Aims to Solve

In the technology disclosed in Patent Document 1, the particles that are deposited in order to form the composite region (hereinafter also referred to as a "filter layer" in the present description) are supplied and deposited by a gas-solid two phase flow.

The average particle size of the particles that are deposited to form the composite region is prescribed as 1 to 15 µm, and an example in which cordierite particles having an average particle size of 3 µm are supplied by a gas-solid two phase flow is described as a working example.

In the honeycomb filter prepared in this example, it is thought that the particles having an average particle size of 3 µm are deposited uniformly across the entire surface layer of the cell walls.

In the technology described in Patent Document 1, if the particle size of the particles that constitute the composite region is large, then because the gaps between the particles are large, large amounts of PM can sometimes pass through the composite region, so that the collection efficiency cannot be improved. Furthermore, if the PM that has passed through the composite region infiltrates the cell walls and is trapped inside the cell walls, then a "depth filtration" state sometimes occurs, resulting in increased pressure loss.

The present invention has been developed in light of the above circumstances, and has an object of providing a honeycomb filter having low pressure loss and high collection efficiency.

Means for Solution of the Problems

Thus, a honeycomb filter according to claim 1 comprises:
a ceramic honeycomb substrate in which a multitude of cells through which a fluid flows are disposed in parallel in a longitudinal direction and are separated by cell walls, each cell being sealed at an end section at either the fluid inlet side or the fluid outlet side, and
a filter layer which, among the surfaces of the cell walls, is formed on the surface of the cell walls of those cells in which the end section at the fluid inlet side is open and the end section at the fluid outlet side is sealed by a sealing material, wherein
the filter layer comprises spherical ceramic particles, and the average particle size of the spherical ceramic particles increases gradually from the fluid inlet side toward the fluid outlet side.

When an exhaust gas is introduced into the honeycomb filter, the velocity of the exhaust gas is greatest at the end section at the fluid outlet side.

Figure 1:
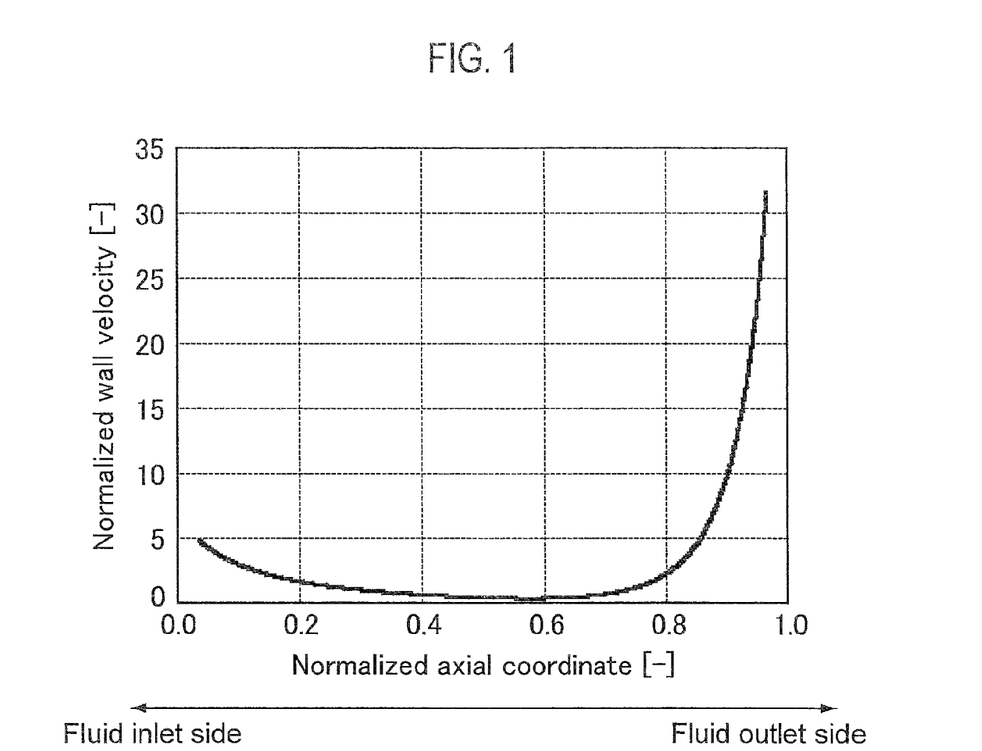
FIG. 1 is a graph illustrating the relationship between the velocity of the exhaust gas and the location inside the cell of a honeycomb filter.

FIG. 1 is a graph illustrating the relationship between the velocity of the exhaust gas and the location inside the cell of the honeycomb filter.

The horizontal axis represents the relative position, where the end section at the fluid inlet side is deemed to be 0 and the end section at the fluid outlet side is deemed to be 1.0, and the vertical axis represents the relative velocity.

Based on this graph, it is evident that the velocity of the exhaust gas increases suddenly at the end section at the fluid outlet side.

Because the velocity of the exhaust gas is high at the end section at the fluid outlet side, the pressure loss increases.

In the honeycomb filter described above, the average particle size of the spherical ceramic particles that constitute the filter layer increases gradually from the fluid inlet side toward the fluid outlet side.

In other words, spherical ceramic particles of small particle size exist at the fluid inlet side, and spherical ceramic particles of large particle size exist at the fluid outlet side.

Figure 2:
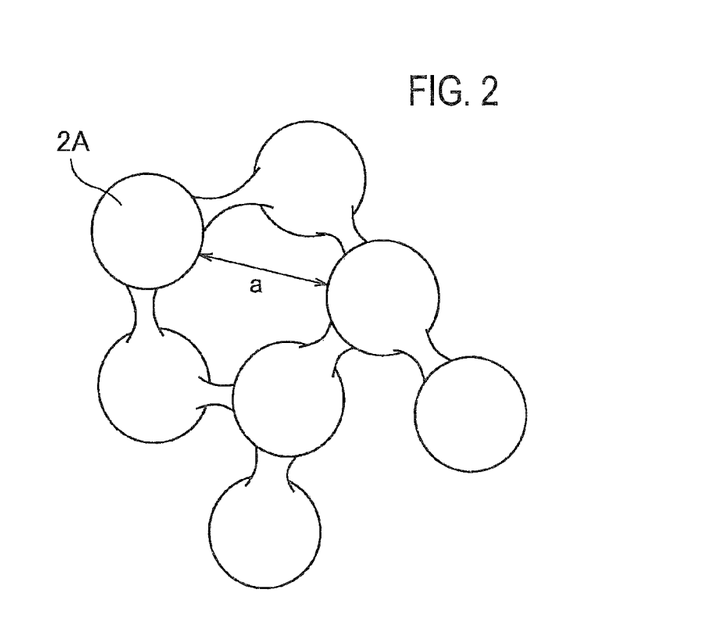
FIG. 2 is a schematic diagram schematically illustrating the shape of a filter layer formed from spherical ceramic particles of large particle size.
Figure 3:
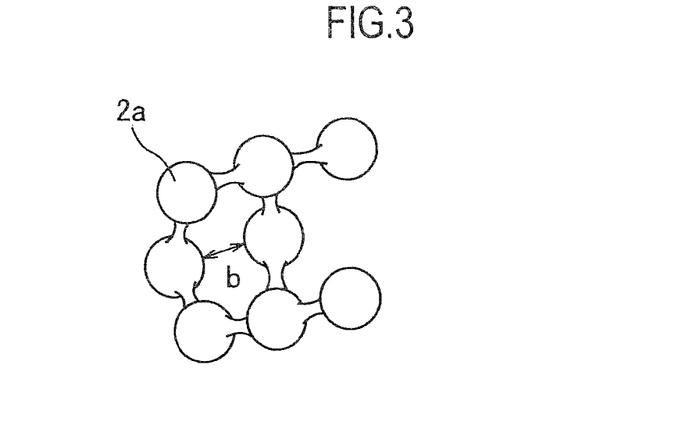
FIG. 3 is a schematic diagram schematically illustrating the shape of a filter layer formed from spherical ceramic particles of small particle size.

FIG. 2 is a schematic diagram schematically illustrating the shape of the filter layer composed of spherical ceramic particles of large particle size, and FIG. 3 is a schematic diagram schematically illustrating the shape of the filter layer composed of spherical ceramic particles of small particle size.

In FIG. 2, the pore size of a pore formed by spherical ceramic particles 2A of large particle size is indicated by the double-headed arrow a.

On the other hand, in FIG. 3, the pore size of a pore formed by spherical ceramic particles 2a of small particle size is indicated by the double-headed arrow b.

Based on these two figures, it is understood that the pore size is large for the filter layer formed from spherical ceramic particles of large particle size, whereas the pore size is small for the filter layer formed from spherical ceramic particles of small particle size.

Accordingly, by increasing the particle size of the spherical ceramic particles that constitute the filter layer at the fluid outlet side, where there is a tendency for pressure loss to increase due to the high velocity of the exhaust gas, pressure loss at the fluid outlet side can be reduced.

Further, because the filter layer at the fluid inlet side has a small pore size, it is suited to trapping PM of small particle size, and the collection efficiency at the fluid inlet side can be enhanced.

As a result, a filter having low pressure loss and high collection efficiency can be obtained.

In a honeycomb filter according to claim 2, the average particle size of the spherical ceramic particles, measured at an arbitrary single point within a region located at a length of 7.5 to 12.5% of the total length of the ceramic honeycomb substrate in the longitudinal direction from the end section at the fluid inlet side, is from 0.3 to 0.6 µm, and the average particle size of the spherical ceramic particles, measured at an arbitrary single point within a region located at a length of 87.5 to 92.5% from the end section at the fluid inlet side, is from 0.6 to 2.5 µm.

When the average particle size of the spherical ceramic particles in the region located at a length of 7.5 to 12.5% from the end section at the fluid inlet side is from 0.3 to 0.6 µm, a filter layer is formed which has a pore size that is suited to the trapping of PM of small particle size, and therefore the collection efficiency at the fluid inlet side can be enhanced.

Further, when the average particle size of the spherical ceramic particles in the region located at a length of 87.5 to 92.5% from the end section at the fluid inlet side is from 0.6 to 2.5 µm, a filter layer is formed which has a pore size through which gas components within the exhaust gas can pass easily, and therefore pressure loss at the fluid outlet side can be reduced.

In a honeycomb filter according to claim 3, the spherical ceramic particles are heat-resistant oxide ceramic particles, and in a honeycomb filter according to claim 4, the heat-resistant oxide ceramic particles are at least one type selected from the group consisting of alumina, silica, mullite, ceria, zirconia, cordierite, zeolite and titania.

When the filter layer is formed from a heat-resistant oxide, even if a regeneration process is performed to incinerate the PM, problems such as melting of the filter layer do not occur. As a result, a honeycomb filter having excellent heat resistance can be obtained.

In a honeycomb filter according to claim 5, the ceramic honeycomb substrate comprises silicon carbide or a silicon-containing silicon carbide.

Silicon carbide and silicon-containing silicon carbides have a high degree of hardness and an extremely high thermal decomposition temperature. As a result, the honeycomb filter becomes a honeycomb filter that exhibits excellent mechanical properties and heat resistance.

EMBODIMENTS FOR CARRYING OUT THE INVENTION

A more detailed description of embodiments of the present invention is provided below. However, the present invention is not limited to the embodiments described below, and various modifications can be made without departing from the scope of the present invention.

First Embodiment

An embodiment of a honeycomb filter of the present invention and a method for producing the honeycomb filter are described below as a first embodiment of the present invention.

In a honeycomb filter according to the first embodiment of the present invention, a ceramic honeycomb substrate (ceramic block) is composed of a plurality of honeycomb calcined bodies. Further, the multitude of cells of the honeycomb calcined bodies that constitute the honeycomb filter include large volume cells and small volume cells, and the area of a large volume cell in a cross section perpendicular to the longitudinal direction is larger than the area of a small volume cell in a cross section perpendicular to the longitudinal direction.

The honeycomb filter according to the first embodiment of the present invention has a filter layer formed on the surface of the cell walls of the ceramic honeycomb substrate comprising the honeycomb calcined bodies.

In this description, a structure without a filter layer formed on the surface of the cell walls is referred to as a "ceramic honeycomb substrate", and a structure with a filter layer formed on the surface of the cell walls is referred to as a "honeycomb filter", thereby distinguishing between the two.

Furthermore, in the following description, references which simply mention a cross section of a honeycomb calcined body indicate a cross section perpendicular to the longitudinal direction of the honeycomb calcined body. Similarly, references which simply mention the cross-sectional area of a honeycomb calcined body indicate the area of a cross section perpendicular to the longitudinal direction of the honeycomb calcined body.

Figure 4:
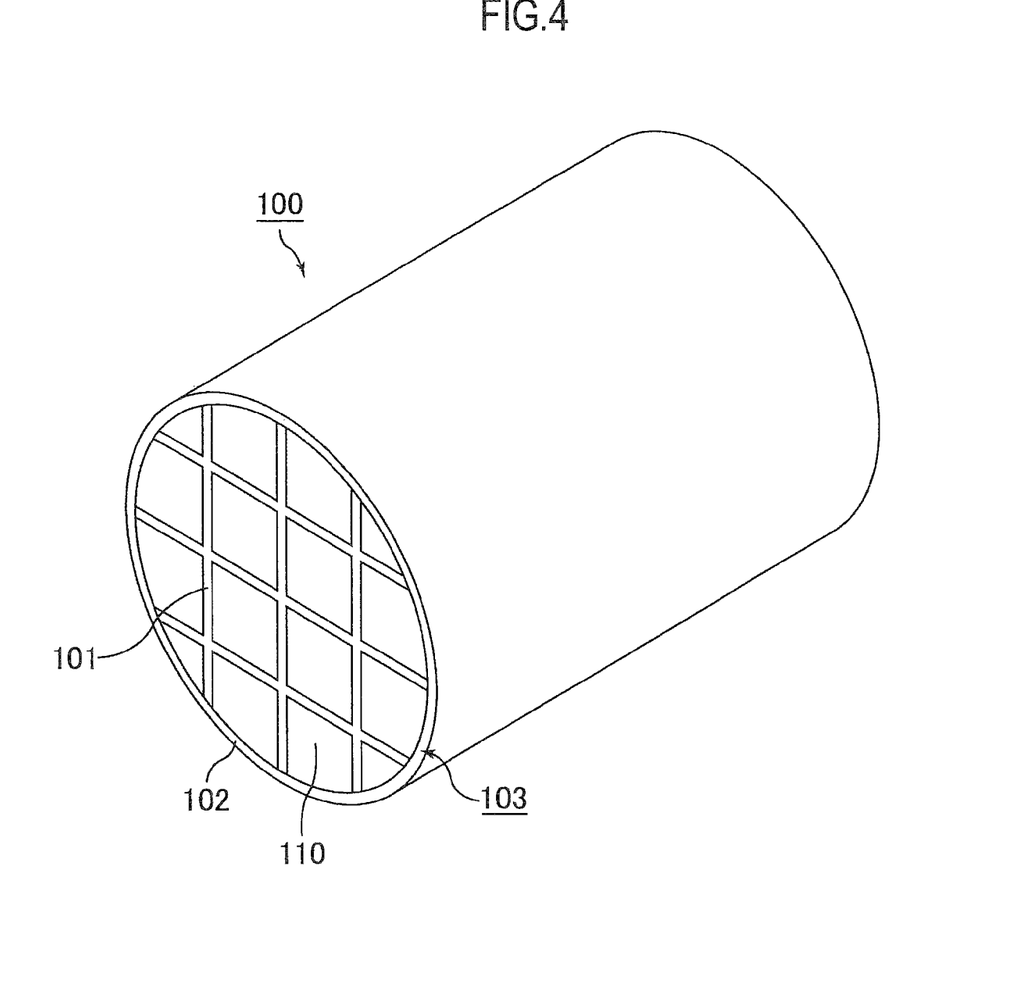
FIG. 4 is a perspective view schematically illustrating an example of a honeycomb filter according to a first embodiment of the present invention.

FIG. 4 is a perspective view schematically illustrating an example of the honeycomb filter according to the first embodiment of the present invention.

Figure 5:
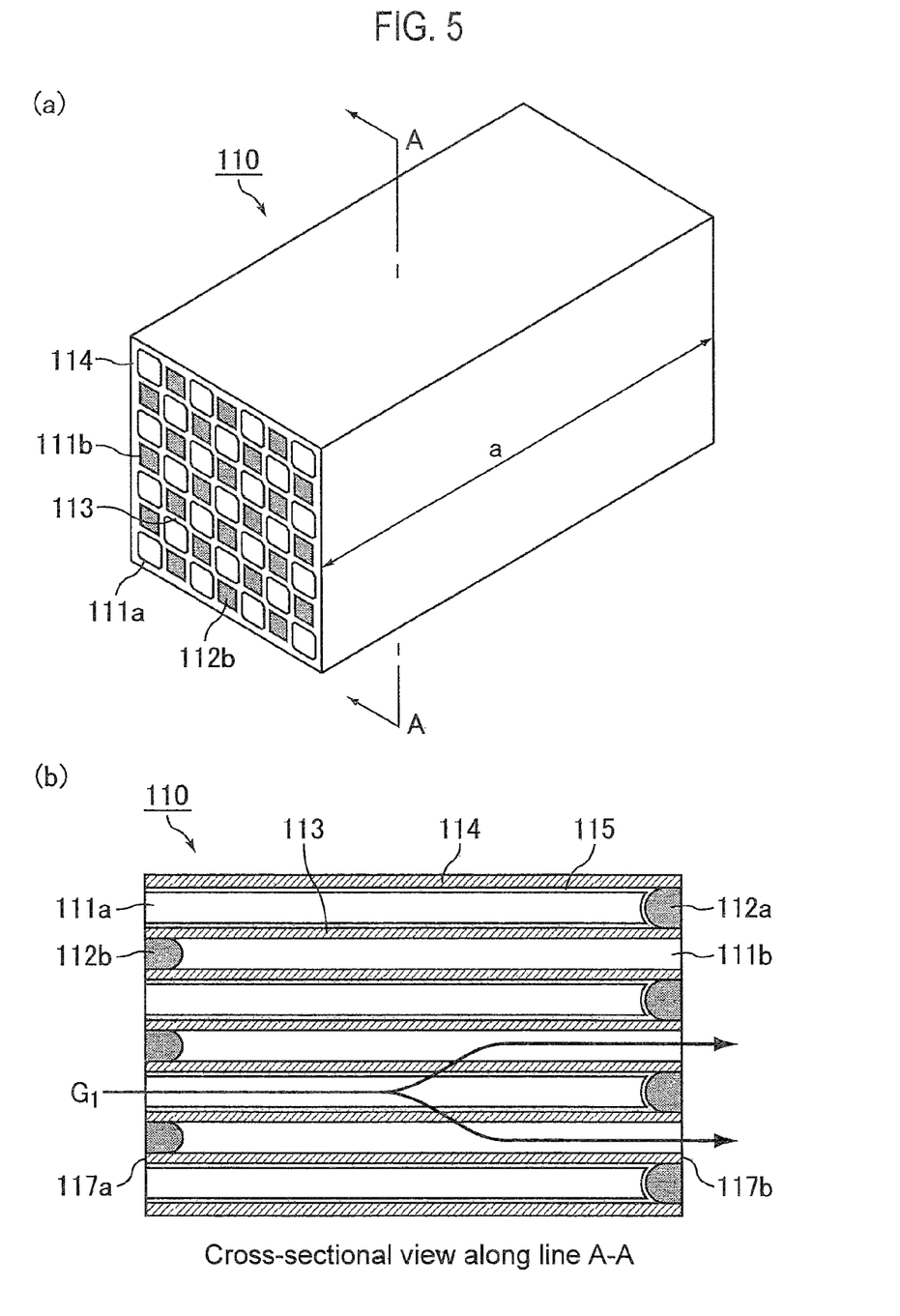
FIG. 5(a) is a perspective view schematically illustrating an example of a honeycomb calcined body that constitutes the honeycomb filter illustrated in FIG. 4.
FIG. 5(b) is a cross-sectional view along the line A-A of the honeycomb calcined body illustrated in FIG. 5(a).

FIG. 5(a) is a perspective view schematically illustrating an example of a honeycomb calcined body that constitutes the honeycomb filter illustrated in FIG. 4. FIG. 5(b) is a cross-sectional view along the line A-A of the honeycomb calcined body illustrated in FIG. 5(a).

In the honeycomb filter 100 illustrated in FIG. 4, a plurality of honeycomb calcined bodies 110 are bundled together via adhesive material layers 101 to form a ceramic honeycomb substrate (ceramic block) 103, and an outer periphery coating layer 102 for preventing leakage of the exhaust gas is formed around the outer periphery of this ceramic honeycomb substrate (ceramic block) 103. The outer periphery coating layer may be formed as needed.

This type of honeycomb filter formed by bundling a plurality of honeycomb calcined bodies is also called an aggregated type honeycomb filter.

Although described in more detail below, the honeycomb calcined bodies 110 which constitute the honeycomb filter 100 are preferably porous bodies formed from silicon carbide or a silicon-containing silicon carbide.

In the honeycomb calcined body 110 illustrated in FIG. 5(a) and FIG. 5(b), a multitude of cells 111a and 111b are disposed in parallel in the longitudinal direction (the direction of arrow a in FIG. 5(a)) and are separated by cell walls 113, and an outer peripheral wall 114 is formed at the outer periphery. One end section of each of the cells 111a and 111b is sealed by a sealing material 112a or 112b.

As illustrated in FIG. 5(b), a filter layer 115 is formed on the surface of the cell walls 113 of the honeycomb calcined body 110. The filter layer 115 is not shown in the honeycomb calcined body 110 illustrated in FIG. 5(a).

In the honeycomb calcined body 110 illustrated in FIG. 5(a) and FIG. 5(b), large volume cells 111a having a cross-sectional area perpendicular to the longitudinal direction that is relatively larger than that of small volume cells 111b, and small volume cells 111b having a cross-sectional area perpendicular to the longitudinal direction that is relatively smaller than that of the large volume cells 111a are arranged alternately.

The shape of the large volume cells 111a in a cross section perpendicular to the longitudinal direction is substantially octagonal, whereas the shape of the small volume cells 111b in a cross section perpendicular to the longitudinal direction is substantially tetragonal.

In the honeycomb calcined body 110 illustrated in FIG. 5(a) and FIG. 5(b), the end sections of the large volume cells 111a on a first end surface 117a side of the honeycomb calcined body 110 are open, and the end sections on a second end surface 117b side are sealed by the sealing material 112a. On the other hand, the end sections of the small volume cells 111b on the second end surface 117b side of the honeycomb calcined body 110 are open, and the end sections on the first end surface 117a side are sealed by the sealing material 112b.

Accordingly, as illustrated in FIG. 5(b), an exhaust gas $G_1$ introduced into a large volume cell 111a (in FIG. 5(b), the exhaust gas is indicated by $G_1$, and the flow of the exhaust gas is indicated by the arrows) necessarily flows out from a small volume cell 111b after passing through the cell wall 113 that separate the large volume cell 111a from the small volume cell 111b. Because the PM and the like in the exhaust gas $G_1$ is trapped when the exhaust gas $G_1$ passes through the cell wall 113, the cell walls 113 that separate the large volume cells 111a and the small volume cells 111b function as filters.

In this manner, gases such as exhaust gases can be passed through the large volume cells 111a and the small volume cells 111b of the honeycomb calcined body 110. When a gas such as an exhaust gas is introduced in the direction illustrated in FIG. 5(b), the end section on the first end surface 117a side of the honeycomb calcined body 110 (the end section where the small volume cells 111b are sealed) is called the fluid inlet side end section, and the end section on the second end surface 117b side of the honeycomb calcined body 110 (the end section where the large volume cells 111a are sealed) is called the fluid outlet side end section.

In other words, the large volume cells 111a in which the end section at the fluid inlet side is open can be called fluid inlet side cells 111a, and the small volume cells 111b in which the end section at the fluid outlet side is open can be called fluid outlet side cells 111b.

The filter layer is described below.

Figure 6:
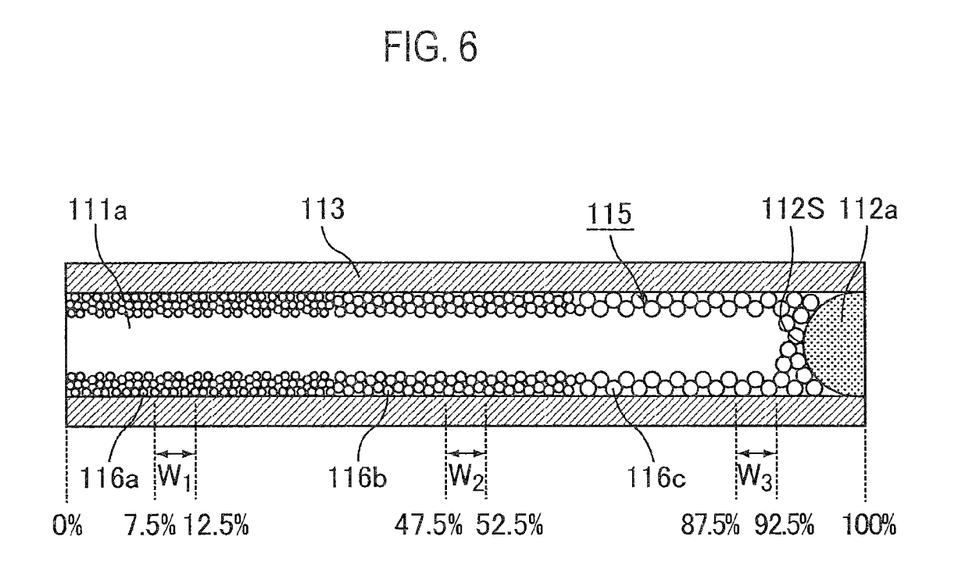
FIG. 6 is an enlarged cross-sectional view schematically illustrating an enlargement of one example of a cell in which the end section at the fluid inlet side is open and the end section at the fluid outlet side is sealed.

FIG. 6 is an enlarged cross-sectional view schematically illustrating an enlargement of an example of a cell in which the end section at the fluid inlet side is open and the end section at the fluid outlet side is sealed.

In FIG. 6, the fact that the average particle size of the spherical ceramic particles of increases gradually from the fluid inlet side toward the fluid outlet side is illustrated schematically.

Further, the filter layer 115 is also formed on a surface 112S of the sealing material that is exposed inside the cell.

In FIG. 6, the spherical ceramic particles that constitute the filter layer 115 are depicted as white circles, and the particle size of the spherical ceramic particles is indicated schematically by the size of those white circles.

In FIG. 6, the spherical ceramic particles 116a that constitute the filter layer at the fluid inlet side are drawn the smallest, and the spherical ceramic particles 116c that constitute the filter layer at the fluid outlet side are drawn the largest.

Further, the spherical ceramic particles 116b that constitute the filter layer in the central portion in the longitudinal direction of the honeycomb calcined body have a particle size that is larger than the particle size of the spherical ceramic particles 116a but smaller than the particle size of the spherical ceramic particles 116c.

Further, in FIG. 6, examples of the ranges in which the particle size of the spherical ceramic particles is measured are also indicated schematically.

The total length of the honeycomb calcined body in the longitudinal direction is deemed to be 100%, wherein the position of the end section at the fluid inlet side is specified as 0%, and the position of the end section at the fluid outlet side is specified as 100%.

Then, positions are specified at positions 7.5% and 12.5% from the end section at the fluid inlet side toward the end section at the fluid outlet side, and the range between these two positions is specified as $W_1$. An electron microscope photograph is acquired at an arbitrary single point within this range $W_1$, and the particle size of a spherical ceramic particle measured from the acquired image becomes the particle size of the spherical ceramic particles that constitute the filter layer at the fluid inlet side.

In a similar manner, positions are specified at 47.5% and 52.5% from the end section at the fluid inlet side toward the end section at the fluid outlet side, and the range between these two positions is specified as $W_2$.

An electron microscope photograph is acquired at an arbitrary single point within this range $W_2$, and the particle size of a spherical ceramic particle measured from the acquired image becomes the particle size of the spherical ceramic particles that constitute the filter layer in the central portion.

In a similar manner, positions are specified at 87.5% and 92.5% from the end section at the fluid inlet side toward the end section at the fluid outlet side, and the range between these two positions is specified as $W_3$.

An electron microscope photograph is acquired at an arbitrary single point within this range $W_3$, and the particle size of a spherical ceramic particle measured from the acquired image becomes the particle size of the spherical ceramic particles that constitute the filter layer at the fluid outlet side.

In the honeycomb filter of the present embodiment, the particle size of the spherical ceramic particles that constitute the filter layer in the central portion is larger than the average particle size of the spherical ceramic particles that constitute the filter layer at the fluid inlet side, and the particle size of the spherical ceramic particles that constitute the filter layer in the central portion is smaller than the average particle size of the spherical ceramic particles that constitute the filter layer at the fluid outlet side.

When these types of relationships are satisfied, it can be said that the average particle size of the spherical ceramic particles that constitute the filter layer increases gradually from the fluid inlet side toward the fluid outlet side.

The average particle size of the particles that constitute the filter layer can be measured by the following method.

First, sections of the honeycomb calcined body within the respective ranges $W_1$, $W_2$ and $W_3$ illustrated in FIG. 6 are processed to prepare samples with dimensions of 10 mm×10 mm×10 mm.

A single arbitrary position on the surface of each of the prepared samples is then observed using a scanning electron microscope (SEM). At this time, the conditions are set so that the particles that constitute the filter layer appear within a single field of view. Here, as a SEM, model FE-SEM S-4800 manufactured by Hitachi, Ltd. is used. Further, the imaging conditions for the SEM include an accelerating voltage of 15.00 kV, a working distance (WD) of 15:00 mm, and a magnification of 10,000×.

Next, the particle size of every particle within the single field of view is measured visually. The average value of the particle sizes of all the particles measured in the single field of view is deemed the average particle size.

FIG. 7(a), FIG. 7(b) and FIG. 7(c) are electron microscope photographs of a filter layer.

The photograph illustrated in FIG. 7(a) is a photograph of the filter layer acquired in the range $W_1$, the photograph illustrated in FIG. 7(b) is a photograph of the filter layer acquired in the range $W_2$, and the photograph illustrated in FIG. 7(c) is a photograph of the filter layer acquired in the range $W_3$.

Of the particle sizes of the spherical ceramic particles (116a, 116b, 116c) which appear in these three photographs, the spherical ceramic particles 116a in FIG. 7(a) are the smallest, and the spherical ceramic particles 116c in FIG. 7(c) are the largest. The size of the spherical ceramic particles 116b in FIG. 7(b) are intermediate between the sizes of the spherical ceramic particles 116a and the spherical ceramic particles 116c.

These photographs also indicate that the average particle size of the spherical ceramic particles that constitute the filter layer increases gradually from the fluid inlet side toward the fluid outlet side.

By measuring the particle size of all the particles in the SEM photographs and then plotting the particle size along the horizontal axis and the numerical frequency along the vertical axis, particle size distribution curves can be obtained.

Figure 7:
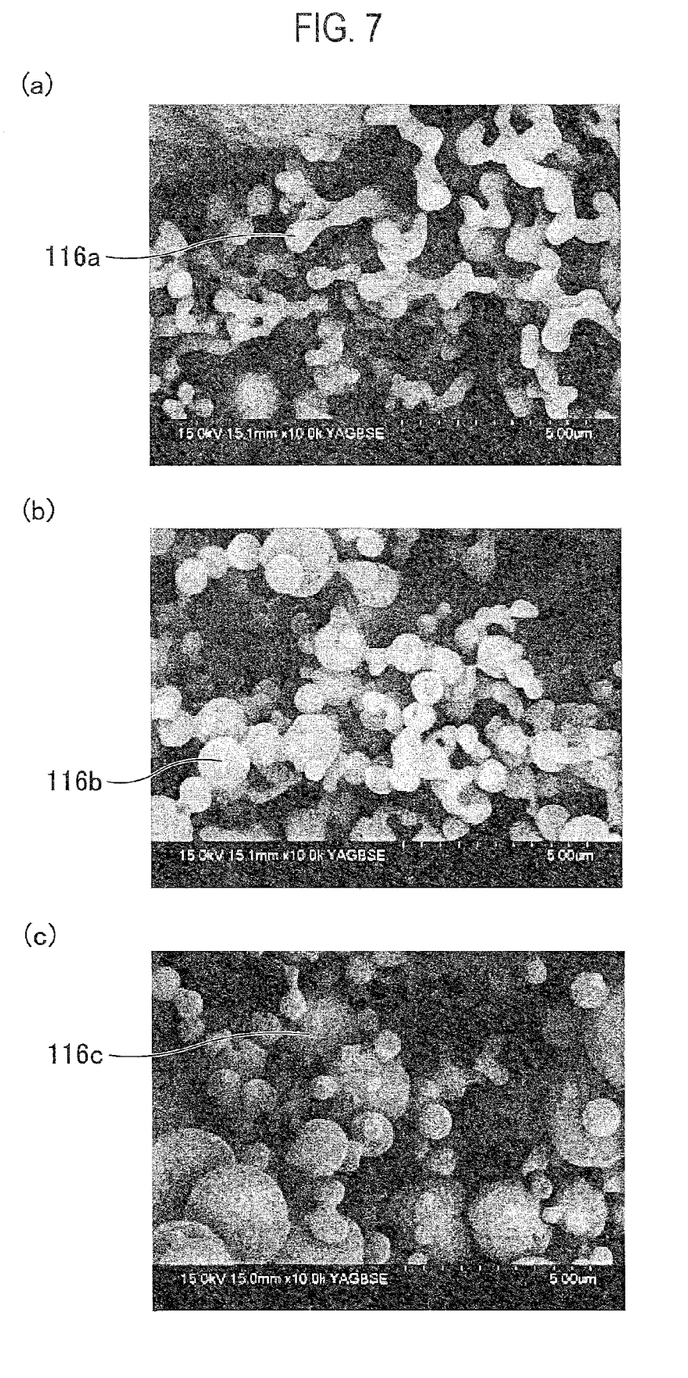
FIG. 7(a), FIG. 7(b) and FIG. 7(c) are electron microscope photographs of a filter layer.
Figure 8:
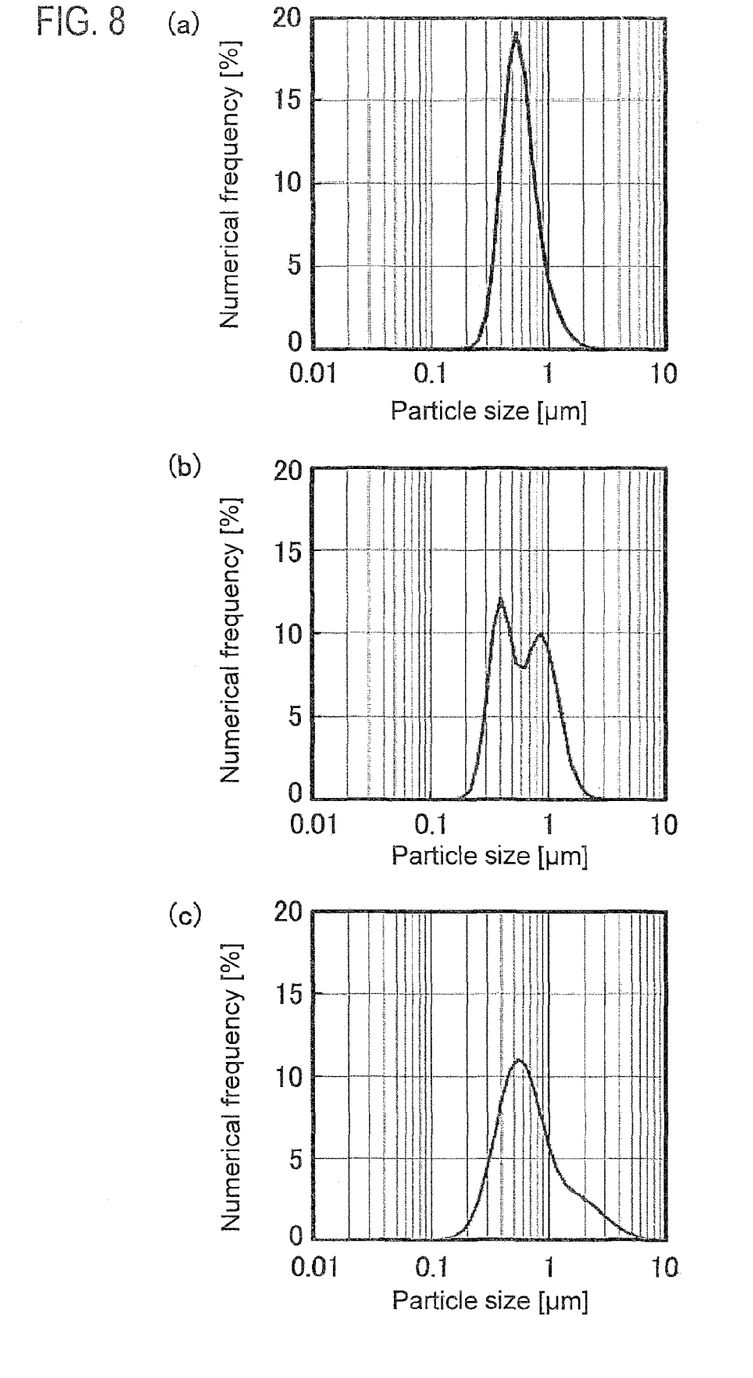
FIG. 8(a), FIG. 8(b) and FIG. 8(c) are diagrams illustrating particle size distribution curves for particles which constitute a filter layer.

FIG. 8(a), FIG. 8(b) and FIG. 8(c) are diagrams illustrating the particle size distribution curves for the particles which constitute the filter layer. The particle size distribution curves shown in FIG. 8(a), FIG. 8(b) and FIG. 8(c) are the particle size distribution curves obtained from the electron microscope photographs shown in FIG. 7(a), FIG. 7(b) and FIG. 7(c) respectively.

The average particle sizes for the spherical ceramic particles shown in FIG. 8(a), FIG. 8(b) and FIG. 8(c) are 0.58 μm, 0.59 μm and 0.70 μm respectively. This confirms that the average particle size of the spherical ceramic particles that constitute the filter layer increases gradually from the fluid inlet side toward the fluid outlet side.

In the honeycomb filter of the present embodiment, it is desirable that the average particle size of the spherical ceramic particles that constitute the filter layer at the fluid inlet side is from 0.3 to 0.6 μm, and the average particle size of the spherical ceramic particles that constitute the filter layer at the fluid outlet side is from 0.6 to 2.5 μm.

In the honeycomb filter according to the first embodiment of the present invention, the spherical ceramic particles that constitute the filter layer are preferably heat-resistant oxide ceramic particles.

Examples of the heat-resistant oxide ceramic particles include alumina, silica, mullite, ceria, zirconia, cordierite, zeolite, and titania. These may be used individually, or a combination of two or more of them may be used.

Of the above heat-resistant oxide ceramic particles, alumina is preferred.

In the honeycomb filter according to the first embodiment of the present invention, the filter layer is formed only on the surface of the cell walls of those cells in which the end section at the fluid inlet side is open and the end section at the fluid outlet side is sealed.

Because the exhaust gas is introduced into the cells from the fluid inlet side of the honeycomb filter, the PM in the exhaust gas is deposited in large amounts on the cell walls of those cells in which the end section at the fluid inlet side is open and the end section at the fluid outlet side is sealed. Accordingly, if the filter layer is formed only on the surface of the cell walls of those cells in which the end section at the fluid inlet side is open and the end section at the fluid outlet side is sealed, then depth filtration of the PM deposited on these cell walls can be efficiently prevented.

In the honeycomb filter according to the first embodiment of the present invention, examples of the shapes of cross sections perpendicular to the longitudinal direction of the large volume cells and the small volume cells within the honeycomb calcined bodies include the shapes described below.

Figure 9:
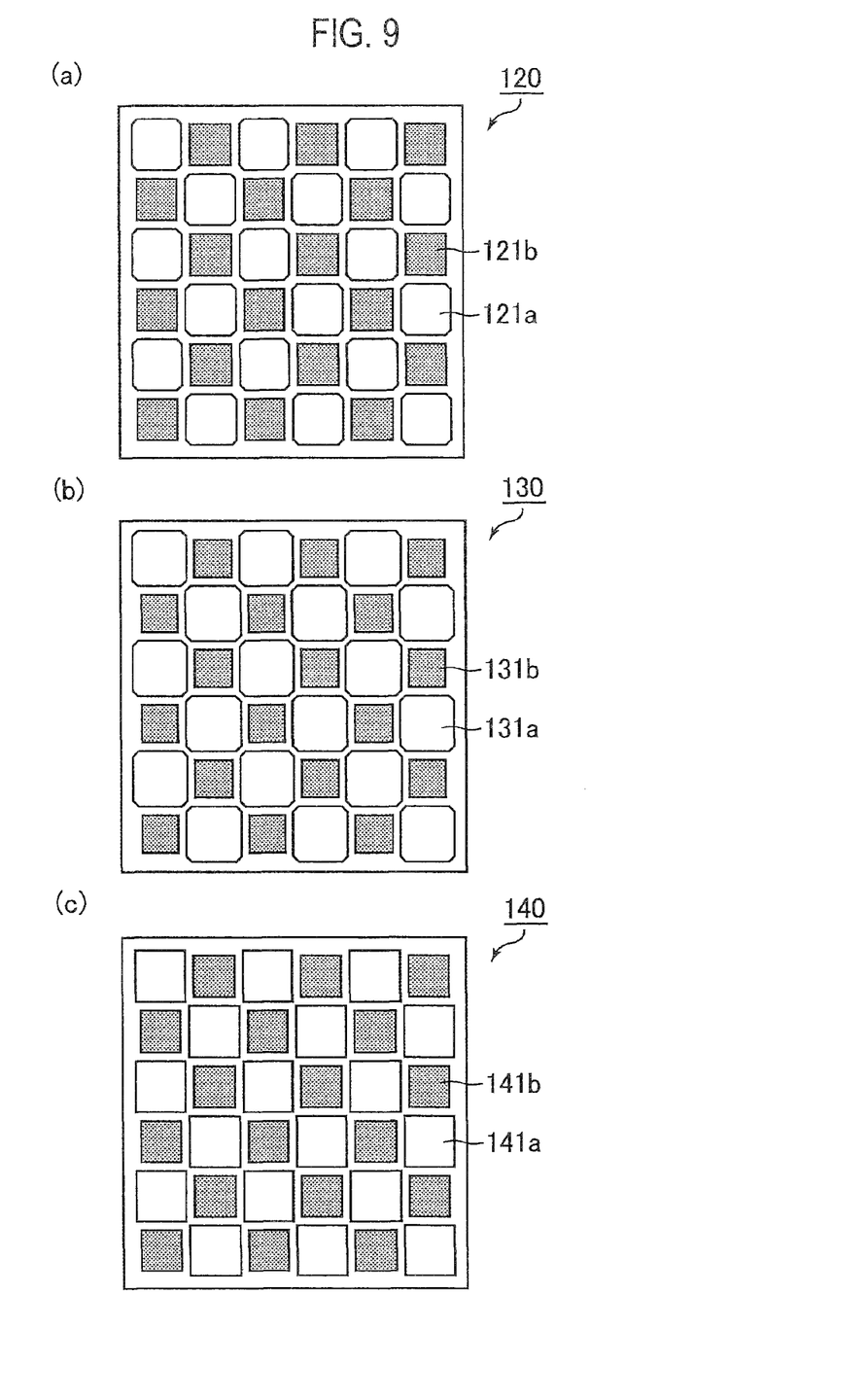
FIG. 9(a), FIG. 9(b) and FIG. 9(c) are side views schematically illustrating examples of the cell structure of the honeycomb calcined body that constitutes the honeycomb filter according to the first embodiment of the present invention.

FIG. 9(a), FIG. 9(b) and FIG. 9(c) are side views schematically illustrating examples of the cell structure of a honeycomb calcined body that constitutes the honeycomb filter according to the first embodiment of the present invention.

In FIG. 9(a), FIG. 9(b) and FIG. 9(c), the filter layer is not shown.

In a honeycomb calcined body 120 illustrated in FIG. 9(a), the shape of large volume cells 121a in a cross section perpendicular to the longitudinal direction is substantially octagonal, the shape of small volume cells 121b in a cross section perpendicular to the longitudinal direction is substantially tetragonal, and the large volume cells 121a and the small volume cells 121b are arranged in an alternating pattern. Similarly, in a honeycomb calcined body 130 illustrated in FIG. 9(b), the shape of large volume cells 131a in a cross section perpendicular to the longitudinal direction is substantially octagonal, the shape of small volume cells 131b in a cross section perpendicular to the longitudinal direction is substantially tetragonal, and the large volume cells 131a and the small volume cells 131b are arranged in an alternating pattern. The honeycomb calcined body 120 illustrated in FIG. 9(a) and the honeycomb calcined body 130 illustrated in FIG. 9(b) have different area ratios between the area of a cross section perpendicular to the longitudinal direction of a large volume cell relative to the area of a cross section perpendicular to the longitudinal direction of a small volume cell (area of cross section perpendicular to the longitudinal direction of large volume cell/area of cross section perpendicular to the longitudinal direction of small volume cell).

Furthermore, in a honeycomb calcined body 140 illustrated in FIG. 9(c), the shape of large volume cells 141a in a cross section perpendicular to the longitudinal direction is substantially tetragonal, the shape of small volume cells 141b in a cross section perpendicular to the longitudinal direction is substantially tetragonal, and the large volume cells 141a and the small volume cells 141b are arranged in an alternating pattern.

In the honeycomb filter according to the first embodiment of the present invention, the area ratio of the area of a cross section perpendicular to the longitudinal direction of a large volume cell relative to the area of a cross section perpendicular to the longitudinal direction of a small volume cell (area of cross section perpendicular to the longitudinal direction of large volume cell/area of cross section perpendicular to the longitudinal direction of small volume cell) is preferably within a range from 1.4 to 2.8, and more preferably from 1.5 to 2.4.

By using the large volume cells as the fluid inlet side cells and the small volume cells as the fluid outlet side cells, a large amount of PM can be deposited on the fluid inlet side cells (large volume cells), but if the aforementioned area ratio is less than 1.4, then because the difference between the cross sectional area of the large volume cells and the cross sectional area of the small volume cells is small, the effects obtained by providing large volume cells and small volume cells are not so significant. On the other hand, if the area ratio exceeds 2.8, then the area of the cross section perpendicular to the longitudinal direction of the small volume cells becomes too small, and the friction generated when a gas such as an exhaust gas passes through the fluid outlet side cells (small volume cells) causes an increase in the pressure loss.

Next, a method for producing a honeycomb filter according to the first embodiment of the present invention is described.

A method for producing a honeycomb filter according to a first embodiment of the present invention is a method for producing a honeycomb filter comprising:

a ceramic honeycomb substrate in which a multitude of cells through which a fluid flows are disposed in parallel in a longitudinal direction and are separated by cell walls, each cell being sealed at an end section at either the fluid inlet side or the fluid outlet side, and a filter layer which, among the surfaces of the cell walls, is formed on the surface of the cell walls of those cells in which the end section at the fluid inlet side is open and the end section at the fluid outlet side is sealed, in which the filter layer comprises spherical ceramic particles, and the average particle size of the spherical ceramic particles increases gradually from the fluid inlet side toward the fluid outlet side, the method comprising:

a honeycomb calcined body production step of producing, from ceramic powders, a porous honeycomb calcined body in which a multitude of cells are disposed in parallel in a longitudinal direction and are separated by cell walls, each cell being sealed at an end section at either the fluid inlet side or the fluid outlet side, a droplet dispersion step of dispersing droplets containing a raw material of the spherical ceramic particles in a carrier gas, a drying step of drying the carrier gas at 100 to 800° C., thereby forming spherical ceramic particles from the droplets containing the raw material of the spherical ceramic particles, an inflow step of introducing the carrier gas into those cells in which the end section at the fluid inlet side is open and the end section at the fluid outlet side is sealed, thereby depositing the spherical ceramic particles on the surface of the cell walls, and a heating step of heating the ceramic honeycomb substrate to 1100 to 1500° C.

In the method for producing the honeycomb filter according to the first embodiment of the present invention, a ceramic honeycomb substrate containing honeycomb calcined bodies is prepared, and a filter layer is formed on the surface of the cell walls of the ceramic honeycomb substrate.

Prior to describing the other steps, the procedure for the steps for forming the filter layer is described below.

In the present embodiment, the filter layer is formed on the surface of the cell walls of the ceramic honeycomb substrate by performing the droplet dispersion step, the drying step, the carrier gas inflow step, and the ceramic honeycomb substrate heating step.

Furthermore, in the description of the present embodiment, the case in which the material that constitutes the filter layer is a heat-resistant oxide is described as an example.

The step of preparing the ceramic honeycomb substrate containing the honeycomb calcined bodies will be described later in the specification.

Figure 10:
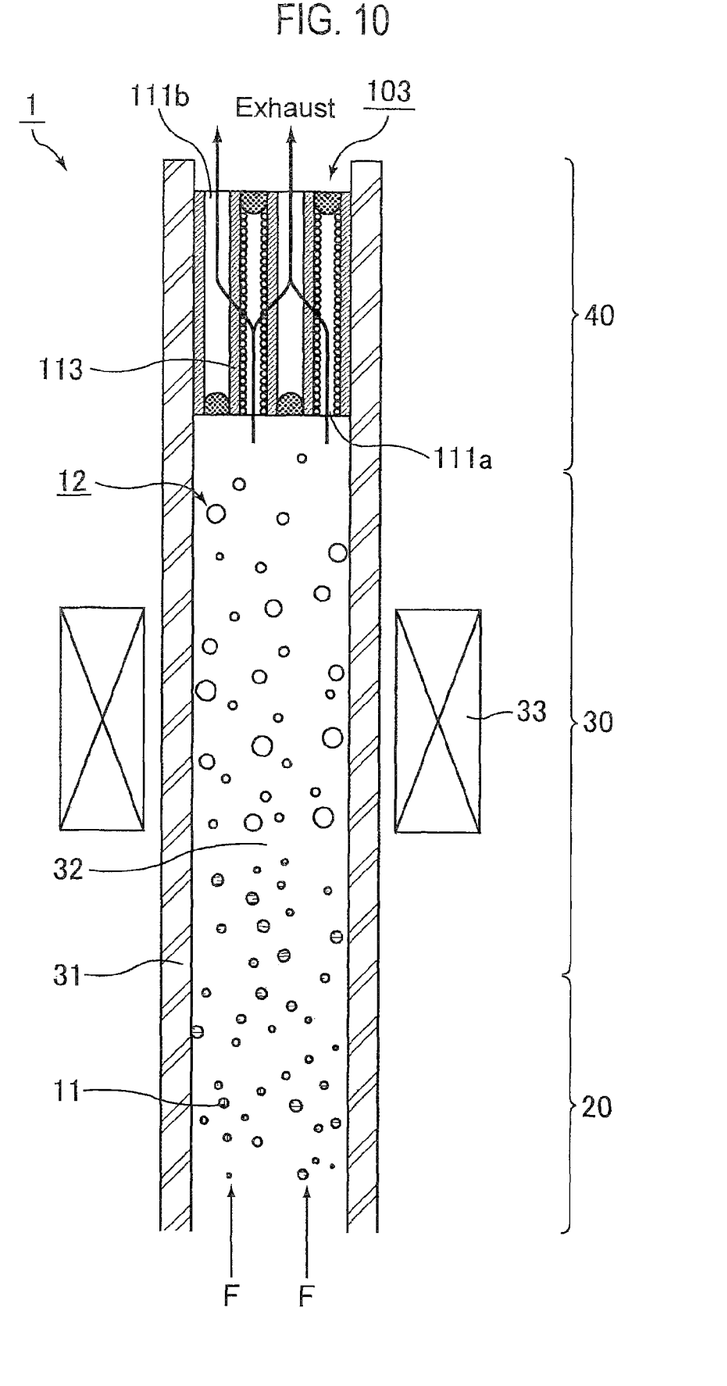
FIG. 10 is a cross-sectional view schematically illustrating an embodiment of a droplet dispersion step and a carrier gas inflow step.

FIG. 10 is a cross-sectional view schematically illustrating an embodiment of the droplet dispersion step and the carrier gas inflow step.

FIG. 10 shows a carrier gas inflow device 1, which is a device that introduces the carrier gas into the cells of the ceramic honeycomb substrate.

The carrier gas inflow device 1 comprises a droplet dispersion section 20 which disperses droplets within the carrier gas, a pipe section 30 through which the carrier gas containing the dispersed droplets travels, and an inflow section 40 which introduces the carrier gas into the cells of the ceramic honeycomb substrate.

An example of using the carrier gas inflow device 1 to perform the droplet dispersion step and the carrier gas inflow step is described below.

In the carrier gas inflow device 1, a carrier gas F flows from the bottom of FIG. 10 toward the top. In the carrier gas inflow device 1, the carrier gas F is introduced from the bottom of the carrier gas inflow device 1, passes through the droplet dispersion section 20, the pipe section 30 and the inflow section 40, and is discharged from the top of the inflow section 40.

The carrier gas F is pressurized from the bottom to the top in FIG. 10, by a pressure difference produced by either a pressure applied from below the carrier gas inflow device or a suction applied from above the carrier gas inflow device, causing the carrier gas F to flow upward through the inside of the carrier gas inflow device 1.

A gas which does not react upon heating at up to 800° C. and does not react with the components in the droplets dispersed within the carrier gas is used as the carrier gas.

Examples of the carrier gas include gases such as air, nitrogen, and argon.

In the droplet dispersion section 20 of the carrier gas inflow device 1, an oxide-containing solution stored in a tank not shown in the figure is converted to droplets 11 by spraying, and dispersed within the carrier gas F.

The expression "oxide-containing solution" is a concept which includes a solution containing a heat-resistant oxide precursor which forms a heat-resistant oxide upon heating, or a slurry containing heat-resistant oxide particles.

A heat-resistant oxide precursor means a compound which is converted to a heat-resistant oxide by heating.

Examples include a hydroxide, carbonate, nitrate or hydrate of the metal that constitutes the heat-resistant oxide.

Examples of the heat-resistant oxide precursor when the heat-resistant oxide is alumina, that is an alumina precursor, include aluminum nitrate, aluminum hydroxide, boehmite, and diaspore.

Furthermore, the slurry containing heat-resistant oxide particles is a solution of heat-resistant oxide particles suspended in water.

The droplets 11 dispersed in the carrier gas F flow upward through the carrier gas inflow device 1, carried by the flow of the carrier gas F, and pass through the pipe section 30.

The pipe section 30 of the carrier gas inflow device 1 is a pipe through which the carrier gas F containing the dispersed droplets 11 passes.

A channel 32 of the pipe section 30 through which the carrier gas F passes is a space enclosed by a pipe wall 31 of the pipe.

In the carrier gas inflow device 1 used in the present embodiment, a heating mechanism 33 is provided on the pipe section 30.

An example of the heating mechanism 33 is an electric heater or the like.

In the present embodiment, the pipe wall 31 of the pipe is heated using the heating mechanism 33, and the carrier gas F containing the dispersed droplets 11 is passed through the pipe section 30. Accordingly, the carrier gas F that passes through the pipe section 30 is heated, thereby heating the droplets 11 dispersed within the carrier gas F. When the droplets 11 are heated, the liquid component contained in the droplets evaporates, forming spherical ceramic particles 12.

In FIG. 10, the spherical ceramic particles 12 are depicted as white circles.

When the droplets contain a heat-resistant oxide precursor, heating the carrier gas causes the heat-resistant oxide precursor to become a heat-resistant oxide (spherical ceramic particles).

In the present embodiment, it is preferable that the pipe wall 31 of the pipe is heated to 100 to 800° C. using the heating mechanism 33, and that the carrier gas F containing the dispersed droplets 11 passes through the pipe in 0.1 to 3.0 seconds.

If the temperature of the heated pipe is less than 100° C., and the time taken for the carrier gas to pass through the pipe is less than 0.1 second, then the water in the droplets may not be able to be evaporated adequately.

On the other hand, if the temperature of the heated pipe exceeds 800° C., and the time taken for the carrier gas to pass through the pipe exceeds 3.0 seconds, then the amount of energy required to produce the honeycomb filter becomes too large, reducing the production efficiency of the honeycomb filter.

In the present embodiment, there are no particular restrictions on the length of the pipe, but the length is preferably from 500 to 3,000 mm.

If the length of the pipe is less than 500 mm, then the water in the droplets cannot be adequately evaporated even if the carrier gas is passed through the pipe slowly. On the other hand, if the length of the pipe exceeds 3,000 mm, then the device used to produce the honeycomb filter becomes too large, reducing the production efficiency of the honeycomb filter.

The spherical ceramic particles 12 remain dispersed within the carrier gas F, flow upward through the carrier gas inflow device 1 carried by the flow of the carrier gas F, and flow into the cells of the ceramic honeycomb substrate 103 in the inflow section 40.

In the present embodiment, a ceramic block formed by bundling a plurality of honeycomb calcined bodies together via adhesive material layers is used as the ceramic honeycomb substrate.

The ceramic honeycomb substrate 103 is disposed at the top of the carrier gas inflow device 1 so as to plug the outlet of the carrier gas inflow device 1.

As a result, the carrier gas F must necessarily flow into the interior of the ceramic honeycomb substrate 103.

In FIG. 10, a cross section of the honeycomb calcined body that constitutes the ceramic block (a similar cross section to that illustrated in FIG. 5(*b*)) is shown schematically as the cross section of the ceramic honeycomb substrate 103.

In the ceramic honeycomb substrate 103, the end sections of the fluid inlet side cells 111*a* are open, and the fluid outlet side cells 111*b* are sealed.

As a result, the carrier gas F flows into the ceramic honeycomb substrate 103 through the openings of the fluid inlet side cells 111*a*.

When the carrier gas F containing the dispersed spherical ceramic particles 12 flows into the fluid inlet side cells 111*a* of the ceramic honeycomb substrate 103, the spherical ceramic particles 12 accumulate on the surfaces of the cell walls 113 of the ceramic honeycomb substrate 103.

Further, in the present embodiment, the ceramic honeycomb substrate 103 is preferably heated to 100 to 800° C., so that the carrier gas F is introduced into heated cells.

When the ceramic honeycomb substrate 103 is heated to 100 to 800° C., even if any liquid components remain in the spherical ceramic particles 12, these liquid components evaporate, so that the spherical ceramic particles are deposited on the surface of the cell walls in a dried powder state.

The carrier gas F is introduced into the interior of the ceramic honeycomb substrate 103 through the openings of the fluid inlet side cells 111a, passes through the cell walls 113 of the ceramic honeycomb substrate 103, and flows out through the openings of the fluid outlet side cells 111b.

The carrier gas inflow step is performed using this type of procedure.

The spherical ceramic particles formed in the drying step are a mixture of a plurality of spherical ceramic particles having different particle sizes. In the inflow step, the particles of large particle size are carried by the flow of the carrier gas, and are more likely to reach, and be deposited on, the cell walls at the fluid outlet side (in the vicinity of the sealing material). On the other hand, the particles of small particle size are more likely to be deposited on the cell walls at the fluid inlet side.

As a result, the average particle size of the spherical ceramic particles tends to increase gradually from the fluid inlet side toward the fluid outlet side.

Subsequently, the ceramic honeycomb substrate heating step is performed.

The ceramic honeycomb substrate having the spherical ceramic particles adhered to the cell walls as a result of the carrier gas inflow step is heated at a furnace temperature of 1100 to 1500° C. using a heating furnace.

An open air atmosphere, nitrogen atmosphere or argon atmosphere is preferable as the heating atmosphere.

This heating step causes a portion of the spherical ceramic particles to undergo sintering, thus forming crosslinked bodies where the spherical ceramic particles are bound to each other.

Moreover, as a result of the heating, the spherical ceramic particles adhered to the surfaces of the cell walls undergo thermal contraction, which anchors the particles strongly to the surfaces of the cell walls.

The filter layer is formed by the above steps.

In the method for producing the honeycomb filter according to the first embodiment of the present invention, the steps for preparing the ceramic honeycomb substrate containing the honeycomb calcined bodies are described below.

The ceramic honeycomb substrate prepared by the following steps is a ceramic block formed by bundling a plurality of honeycomb calcined bodies together via adhesive material layers.

In the following explanation, silicon carbide is used as an example of the ceramic powder.

(1) A molding step is performed in which a honeycomb molded body is prepared by extrusion molding of a wet mixture containing the ceramic powder and a binder.

Specifically, first, a wet mixture for producing the honeycomb molded body is prepared by mixing silicon carbide powders with different average particle sizes as the ceramic powder, an organic binder, a liquid plasticizer, a lubricant, and water.

Next, the wet mixture is fed into an extrusion molding machine and extrusion molded to prepare a honeycomb molded body with a predetermined shape.

Here, the honeycomb molded body is prepared using a mold that produces a cross-sectional shape having the cell structure (cell shape and cell arrangement) illustrated in FIG. 5(a) and FIG. 5(b).

(2) The honeycomb molded body is cut to a predetermined length and dried using a microwave dryer, hot air dryer, dielectric dryer, reduced pressure dryer, vacuum dryer, or freeze dryer or the like, and a sealing step is then performed in which predetermined cells are packed with a sealing material paste that becomes the sealing material, thereby sealing those cells.

Here, the wet mixture described above can be used as the sealing material paste.

(3) After performing a degreasing step in which the honeycomb molded body is heated in a degreasing furnace to remove the organic matter within the honeycomb molded body, the degreased honeycomb molded body is transported into a calcining furnace and subjected to a calcination step, thereby preparing a honeycomb calcined body of the type illustrated in FIG. 5(a) and FIG. 5(b).

The sealing material paste packed at the end sections of the cells is calcined by the heating and forms the sealing material.

Furthermore, the conditions for the cutting step, the drying step, the sealing step, the degreasing step and the calcination step can employ the types of conditions conventionally used to prepare honeycomb calcined bodies.

(4) A bundling step is performed in which a plurality of honeycomb calcined bodies are sequentially laminated together via an adhesive material paste upon a support stage, thereby preparing a honeycomb aggregated body having a plurality of stacked honeycomb calcined bodies.

For the adhesive material paste, for example, a paste comprising an inorganic binder, an organic binder and inorganic particles is used. Further, the adhesive material paste may also contain inorganic fibers and/or whiskers.

(5) By heating the honeycomb aggregated body, the adhesive material paste is thermally hardened and forms an adhesive material layer, thus preparing a quadrangular prism-shaped ceramic block.

The thermal hardening conditions for the adhesive material paste may be the types of conditions conventionally used when preparing honeycomb filters.

(6) A cutting step is performed in which the ceramic block is cut.

Specifically, by cutting the outer periphery of the ceramic block using a diamond cutter, a ceramic block is prepared with an outer periphery that has been processed to a substantially circular cylindrical shape.

(7) An outer periphery coating layer formation step is performed in which an outer periphery coating material paste is applied to the outer peripheral surface of the substantially circular cylindrical ceramic block, and then dried and solidified to form an outer periphery coating layer.

Here, the adhesive material paste mentioned above can be used as the outer periphery coating material paste. A paste with a different composition from the above adhesive material paste may also be used as the outer periphery coating material paste.

The outer periphery coating layer need not necessarily be provided, and may be provided as required.

By providing the outer periphery coating layer, the shape of the outer periphery of the ceramic block can be neatened, enabling a ceramic honeycomb substrate with a circular cylindrical shape to be obtained.

By performing the above steps, a ceramic honeycomb substrate containing honeycomb calcined bodies can be prepared.

By subsequently subjecting the ceramic honeycomb substrate to the aforementioned droplet dispersion step, carrier gas inflow step, and ceramic honeycomb substrate heating step, the filter layer can be formed on the surface of the cell walls of the ceramic honeycomb substrate, thus preparing a honeycomb filter.

Examples of the actions and effects of the honeycomb filter according to the first embodiment of the present invention and the method for producing the honeycomb filter are described below.

(1) In the honeycomb filter of the present embodiment, the filter layer is formed on the surface of the cell walls of those cells in which the end section at the fluid inlet side is open and the end section at the fluid outlet side is sealed. As a result, depth filtration of PM can be efficiently prevented.

(2) In the honeycomb filter of the present embodiment, the average particle size of the spherical ceramic particles that constitute the filter layer increases gradually from the fluid inlet side toward the fluid outlet side.

In other words, spherical ceramic particles of small particle size exist at the fluid inlet side, and spherical ceramic particles of large particle size exist at the fluid outlet side.

By increasing the particle size of the spherical ceramic particles that constitute the filter layer at the fluid outlet side, where there is a tendency for pressure loss to increase due to the high velocity of the exhaust gas, the pore size of the filter layer at the fluid outlet side can be increased, and pressure loss at the fluid outlet side can be reduced.

Further, because the filter layer at the fluid inlet side is composed of spherical ceramic particles of small particle size and the pore size of the filter layer is small, the honeycomb filter is suited to the trapping of PM of small particle size, and the collection efficiency at the fluid inlet side can be enhanced.

As a result, a filter having low pressure loss and high collection efficiency can be obtained.

(3) In the honeycomb filter of the present embodiment, the average particle size of the spherical ceramic particles, measured at an arbitrary single point within a region located at a length of 7.5 to 12.5% of the total length of the ceramic honeycomb substrate in the longitudinal direction from the end section at the fluid inlet side, is from 0.3 to 0.6 µm, and the average particle size of the spherical ceramic particles, measured at an arbitrary single point within a region located at a length of 87.5 to 92.5% from the end section at the fluid inlet side, is from 0.6 to 2.5 µm.

When the average particle size of the spherical ceramic particles in the region located at a length of 7.5 to 12.5% from the end section at the fluid inlet side is from 0.3 to 0.6 µm, a filter layer is formed which has a pore size that is suited to the trapping of PM of small particle size, and therefore the collection efficiency at the fluid inlet side can be enhanced.

Further, when the average particle size of the spherical ceramic particles in the region located at a length of 87.5 to 92.5% from the end section at the fluid inlet side is from 0.6 to 2.5 µm, a filter layer is formed which has a pore size through which gas components within the exhaust gas can pass easily, and therefore pressure loss at the fluid outlet side can be reduced.

(4) In the honeycomb filter of the present embodiment, the spherical ceramic particles are heat-resistant oxide ceramic particles, and the heat-resistant oxide ceramic particles are at least one type selected from the group consisting of alumina, silica, mullite, ceria, zirconia, cordierite, zeolite and titania.

When the filter layer is formed from heat-resistant oxide particles, even if a regeneration process is performed to incinerate the PM, problems such as melting of the filter layer do not occur. As a result, a honeycomb filter having excellent heat resistance can be obtained.

(5) In the honeycomb filter of the present embodiment, the ceramic honeycomb substrate comprises silicon carbide or a silicon-containing silicon carbide.

Silicon carbide and silicon-containing silicon carbides have a high degree of hardness and an extremely high thermal decomposition temperature. As a result, the honeycomb filter becomes a honeycomb filter that exhibits excellent mechanical properties and heat resistance.

EXAMPLES

The honeycomb filter of the first embodiment of the present invention is described below in more detail using specific examples. However, the present invention is not limited solely to these examples.

Example 1

(Preparation of Ceramic Honeycomb Substrate)

First, a molding step was performed by mixing 54.6% by weight of a coarse powder of silicon carbide with an average particle size of 22 µm and 23.4% by weight of a fine powder of silicon carbide with an average particle size of 0.5 µm, to which 4.3% by weight of an organic binder (methyl cellulose), 2.6% by weight of a lubricant (Unilube manufactured by NOF Corporation), 1.2% by weight of glycerol and 13.9% by weight of water were added and kneaded to obtain a wet mixture, which was then extrusion-molded.

In this step, crude honeycomb molded bodies having the same shape as the honeycomb calcined body 110 illustrated in FIG. 5(a) but with no sealing of the cells were prepared.

Next, dried honeycomb molded bodies were prepared by drying the crude honeycomb molded bodies using a microwave dryer. Subsequently, a sealing material paste was packed into predetermined cells of the dried honeycomb molded bodies, thereby sealing the cells. A part of the wet mixture described above was used as the sealing material paste. After sealing the cells, the dried honeycomb molded bodies packed with the sealing material paste were dried again using a dryer.

Subsequently, the dried honeycomb molded bodies with sealed cells were subjected to a degreasing treatment at 400° C. to degrease the dried honeycomb molded bodies, and were then subjected to a calcination treatment in a normal pressure argon atmosphere at 2200° C. for 3 hours.

As a result, quadrangular prism-shaped honeycomb calcined bodies were obtained.

An adhesive material paste was applied on the honeycomb calcined bodies obtained by the above steps, thus forming adhesive material paste layers, and by thermally hardening the adhesive material paste layers to form adhesive material layers, a substantially prism-shaped ceramic block composed of 16 honeycomb calcined bodies bundled together via the adhesive material layers was prepared.

For the adhesive material paste, an adhesive material paste containing 30% by weight of alumina fibers with an average fiber length of 20 µm, 21% by weight of silicon carbide particles with an average particle size of 0.6 µm, 15% by weight of a silica sol, 5.6% by weight of carboxymethyl cellulose, and 28.4% by weight of water was used.

Subsequently, a circular cylindrical ceramic block with a diameter of 142 mm was prepared by using a diamond cutter to cut the outer periphery of the prism-shaped ceramic block.

Next, an outer periphery coating material paste was applied to the outer peripheral surface of the circular cylindrical ceramic block, and the outer periphery coating material paste was thermally hardened at 120° C. to form an outer periphery coating layer on the outer peripheral portion of the ceramic block.

The same paste as the adhesive material paste described above was used as the outer periphery coating material paste.

As a result of the above steps, a circular cylindrical ceramic honeycomb substrate with a diameter of 143.8 mm and a length of 150 mm was prepared.

(Droplet Dispersion Step and Filter Layer Formation Step)

A filter layer was formed on the ceramic honeycomb substrate using the carrier gas inflow device illustrated in FIG. 10.

The ceramic honeycomb substrate was placed at the top of the carrier gas inflow device as illustrated in FIG. 10.

At this time, the ceramic honeycomb substrate was positioned so that the openings of the large volume cells, as the fluid inlet side cells, faced toward the bottom of the carrier gas inflow device.

A solution containing boehmite, which is a heat-resistant oxide precursor, was prepared as an oxide-containing solution. The boehmite concentration was 3.8 mol/l.

Droplets containing boehmite were then dispersed in the carrier gas by spraying.

The pipe wall of the pipe of the carrier gas inflow device was heated to a temperature of 200° C., and the carrier gas was introduced so as to flow toward the top of the carrier gas inflow device (the ceramic honeycomb substrate side) at a flow rate of 15.8 mm/sec, thereby evaporating the moisture within the droplets dispersed in the carrier gas. As a result of the evaporation of the moisture in the droplets that occurred as the carrier gas passed through the pipe, the droplets were converted to spherical alumina particles.

The length of the pipe was 1200 mm.

The carrier gas containing the dispersed spherical alumina particles was introduced into the cells of the ceramic honeycomb substrate, and the spherical alumina particles were adhered to the surfaces of the cell walls.

Subsequently, the ceramic honeycomb substrate was removed from the carrier gas inflow device, and heated in a calcining furnace at 1350° C. for 3 hours in an open air atmosphere.

As a result of the above steps, a honeycomb filter was produced which had a filter layer composed of alumina particles formed on the surfaces of the cell walls.

Photographs of the filter layer of the honeycomb filter obtained by the above steps are shown in FIG. 7(*a*), FIG. 7(*b*) and FIG. 7(*c*).

The conditions used for acquiring the SEM photographs were as follows: model FE-SEM S-4800 manufactured by Hitachi, Ltd., a backscattered electron image, an accelerating voltage of 15.0 kV, and a magnification of 10,000×. From photographs acquired in the range $W_1$, the range $W_2$ and the range $W_3$ illustrated in FIG. 6, particle size distribution curves were determined, and the average particle size of the spherical ceramic particles was measured using the measurement method described above.

The average particle sizes for the spherical ceramic particles were 0.58 μm, 0.59 μm and 0.70 μm respectively, confirming that the average particle size of the spherical ceramic particles that constituted the filter layer increased gradually from the fluid inlet side toward the fluid outlet side.

In the honeycomb filter having the filter layer described above, the average particle size of the spherical ceramic particles in the region located at a length of 7.5 to 12.5% from the end section at the fluid inlet side was within the range from 0.3 to 0.6 μm, which forms a filter layer with a pore size suited to the trapping of PM of small particle size, and therefore the collection efficiency at the fluid inlet side was enhanced.

Further, in the honeycomb filter having the filter layer described above, the average particle size of the spherical ceramic particles in the region located at a length of 87.5 to 92.5% from the end section at the fluid inlet side was within the range from 0.6 to 2.5 μm, which forms a filter layer with a pore size through which gas components within the exhaust gas could pass easily, and therefore pressure loss at the fluid outlet side was reduced.

OTHER EMBODIMENTS

In the honeycomb filter according to the first embodiment of the present invention, the filter layer is formed only on the surface of the cell walls of those cells in which the end section at the fluid inlet side is open and the end section at the fluid outlet side is sealed.

However, in a honeycomb filter according to another embodiment of the present invention, the filter layer may be formed not only on the surface of the cell walls of cells in which the end section at the fluid inlet side is open and the end section at the fluid outlet side is sealed, but also on the surface of the cell walls of cells in which the end section at the fluid inlet side is sealed and the end section at the fluid outlet side is open.

This type of honeycomb filter can be produced by immersing the ceramic honeycomb substrate in a slurry containing the spherical ceramic particles that has been prepared in advance, and then heating the resulting product.

In a method for producing a honeycomb filter according to an embodiment of the present invention, the droplets may contain heat-resistant oxide particles as the raw material of the ceramic particles.

When the droplets contain heat-resistant oxide particles, particles of the heat-resistant oxide can be obtained by heating the carrier gas to remove the moisture within the droplets. Moreover, by introducing particles of the heat-resistant oxide into the cells, a filter layer composed of particles of the heat-resistant oxide can be formed.

Further, a filter layer composed of particles of the heat-resistant oxide can also be formed by introducing the droplets containing the heat-resistant oxide particles into the cells, and then removing the moisture within the droplets.

In a honeycomb filter according to an embodiment of the present invention, all of the cells of the honeycomb calcined bodies that constitute the honeycomb filter may have the same shape in a cross section perpendicular to the longitudinal direction, and both the cells that are sealed and the cells that are open at one end surface of the honeycomb calcined bodies may have the same area for cross sections perpendicular to the longitudinal direction of the cells.

In a honeycomb filter according to an embodiment of the present invention, the ceramic honeycomb substrate (ceramic block) may be formed from a single honeycomb calcined body.

This type of honeycomb filter formed from a single honeycomb calcined body is also called an integrated type honeycomb filter. Cordierite or aluminum titanate or the like can be used as the main constituent material of an integrated type honeycomb filter.

In a honeycomb filter according to an embodiment of the present invention, the shape of the cross section of each cell of a honeycomb calcined body in a direction perpendicular to the longitudinal direction of the honeycomb calcined body is not limited to a substantially tetragonal shape, and can be an arbitrary shape such as a substantially circular shape, substantially elliptical shape, substantially pentagonal shape, substantially hexagonal shape, substantially trapezoidal shape, or substantially octagonal shape. Further, a mixture of various shapes may also be used.

In the honeycomb filter of the present invention, the essential structural elements are that the filter layer is formed on the surface of the cell walls of the ceramic honeycomb substrate, that the filter layer comprises spherical ceramic particles, and that the average particle size of the spherical ceramic particles increases gradually from the fluid inlet side toward the fluid outlet side.

By appropriate combination of these essential structural elements with the various configurations described in the first embodiment and the other embodiments (for example, the structure of the filter layer, the method for forming the filter layer, the cell structure of the honeycomb calcined bodies, and the honeycomb filter production steps and the like), the desired effects can be obtained.

DESCRIPTION OF THE REFERENCE NUMERALS

1 Carrier gas inflow device
2A, 2a, 12, 116a, 116b, 116c Spherical ceramic particles
11 Droplets
100 Honeycomb filter
103 Ceramic honeycomb substrate (ceramic block)
110, 120, 130, 140 Honeycomb calcined body
111a, 111b, 121a, 121b, 131a, 131b, 141a, 141b Cell
112a, 112b Sealing material
113 Cell wall
115 Filter layer
F Carrier gas
$G_1$ Exhaust gas

The invention claimed is:

1. A honeycomb filter comprising:
a ceramic honeycomb base material in which a multitude of cells through which a fluid flows are disposed in parallel in a longitudinal direction and are separated by cell walls, each cell being sealed at an end section at either a fluid inlet side or a fluid outlet side, and
a filter layer which, among surfaces of the cell walls, is formed on a surface of the cell walls of those cells in which the end section at the fluid inlet side is open and the end section at the fluid outlet side is sealed by a sealing material, wherein
the filter layer comprises spherical ceramic particles, and an average particle size of the spherical ceramic particles increases gradually from the fluid inlet side toward the fluid outlet side.

2. The honeycomb filter according to claim 1, wherein
an average particle size of the spherical ceramic particles, measured at an arbitrary single point within a region located at a length of 7.5 to 12.5% of a total length of the ceramic honeycomb base material in a longitudinal direction from the end section at the fluid inlet side, is from 0.3 to 0.6 µm, and
an average particle size of the spherical ceramic particles, measured at an arbitrary single point within a region located at a length of 87.5 to 92.5% from the end section at the fluid inlet side, is from 0.6 to 2.5 µm.

3. The honeycomb filter according to claim 1, wherein the spherical ceramic particles are heat-resistant oxide ceramic particles.

4. The honeycomb filter according to claim 3, wherein the heat-resistant oxide ceramic particles are at least one type selected from the group consisting of alumina, silica, mullite, ceria, zirconia, cordierite, zeolite and titania.

5. The honeycomb filter according to any one of claims 1 to 4, wherein the ceramic honeycomb base material comprises silicon carbide or a silicon-containing silicon carbide.

6. The honeycomb filter according to claim 1, wherein the sealing material has a curved surface.

7. The honeycomb filter according to claim 6, wherein the curved surface projects from the end section at the fluid outlet side toward the end section at the fluid inlet side.

8. The honeycomb filter according to claim 7, wherein
a sharp end space is formed between the curved surface and a wall part facing the curved surface in a direction substantially perpendicular to a direction extending from the end section at the fluid outlet side to the end section at the fluid inlet side,
the sharp end space has acute angle between the cell wall and the curved surface at the end section at the fluid outlet side, and
the spherical ceramic particles are provided in the sharp end space.

* * * * *